Feb. 14, 1967 H. VISSERS 3,303,890
SPADING MACHINE
Filed April 9, 1965 2 Sheets-Sheet 2
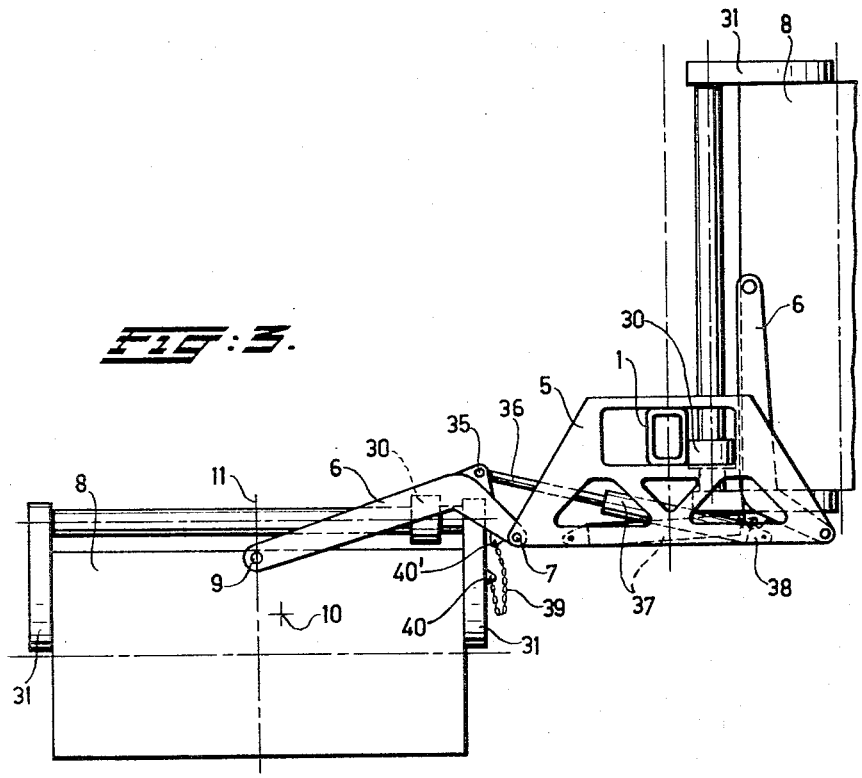
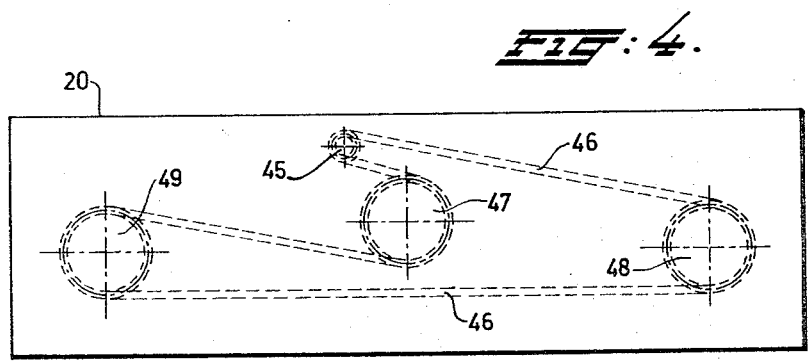
INVENTOR.
HERBERT VISSERS
BY

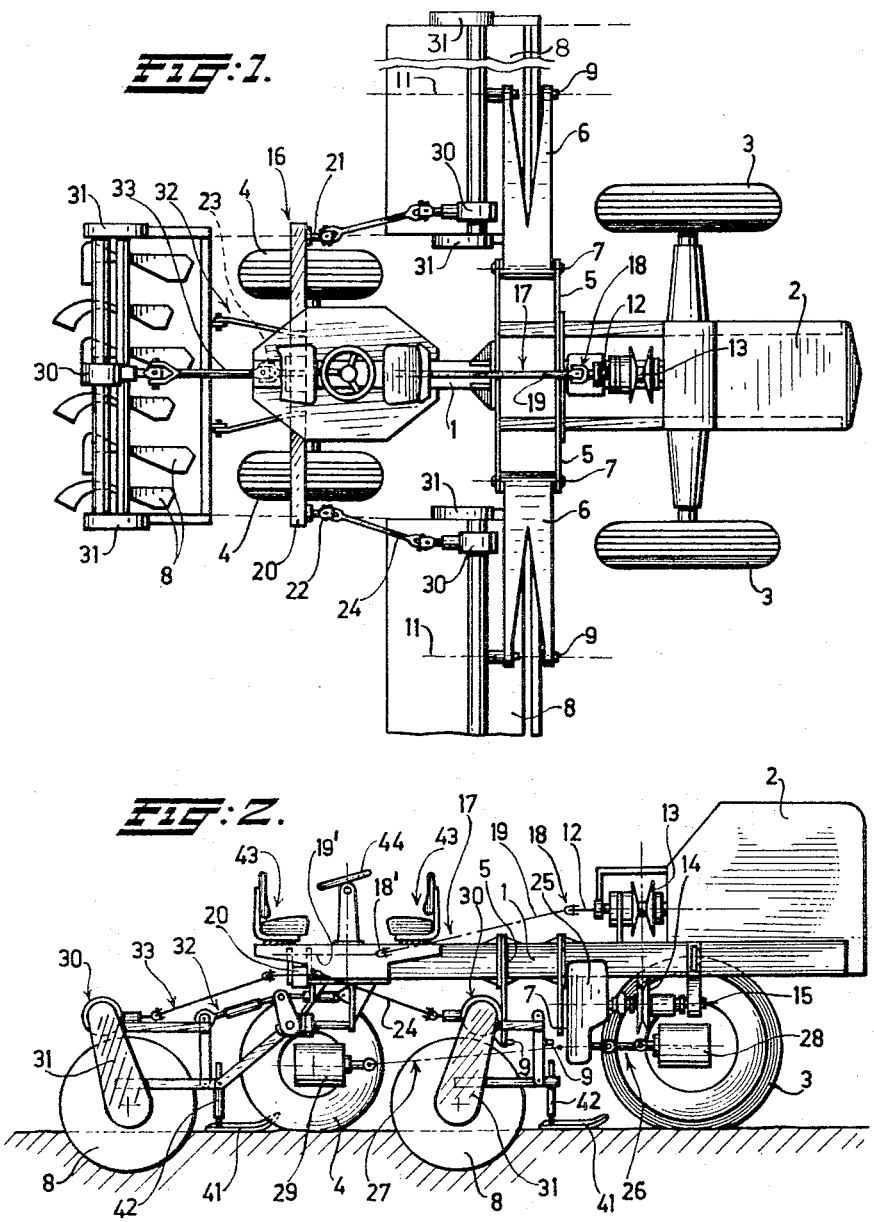

United States Patent Office 3,303,890
Patented Feb. 14, 1967

3,303,890
SPADING MACHINE
Herbert Vissers, Nieuw-Vennep, Netherlands, assignor to Landbouwwerktuigenfabriek H. Vissers N.V., Nieuw-Vennep, Netherlands, a limited-liability company
Filed Apr. 9, 1965, Ser. No. 447,028
Claims priority, application Netherlands, Feb. 19, 1962, 274,972
9 Claims. (Cl. 172—56)

This is a continuation-in-part of my application Ser. No. 258,562, filed February 14, 1963, now abandoned.

My invention relates to a spading machine comprising a tractor having wheels, an engine and a driven shaft, a plurality of spading units for travelling in spading contact with the ground.

A machine of this type is known from the U.S. Patent 3,012,616. The number of spading elements is six which constitute a unit with which in one passage spading can be performed on a front of 2.10 metres.

One of the advantages of this known machine consists in that the clod of earth which is spaded out and raised by each blade, is deposited in the furrow dug out by the spading element with which the blade is associated. This known machine is further advantageous in that in respect of the conventional ploughing by means of a ploughshare, which is dragged so as to cut through the soil, it needs considerably less energy. Even in the event there is employed a rather light tractor, there often remains an excess capacity so that the tractor on working the soil is not operating to the limits of its capacity. The latter circumstance results in that it is aimed at to enlarged the breadth of the portion of soil to be worked in one passage of the machine, as there is sufficient engine capacity available in the tractor for that purpose.

A second reason for enlarging the operational breadth consists in that in some countries on account of the available vast agricultural acreage, people desired a machine with a great capacity.

It is an object of my invention to meet both wants. My invention further aims at keeping a sufficient adhesion weight on the driving wheels of the tractor. As is known this adhesion weight serves to allow for the exertion of a braking force, since properly speaking the whole device is driven by the spading elements. A further object of my invention is to provide a machine in which no tractor wheels can travel on the spaded soil.

My invention further aims at rendering the spading machine practicable under various operational circumstances by providing means for changing the position of at least two spading units in respect of the tractor frame in such a manner that the spading machine can be brought into a transport position, wherein the overall width is considerably less than the operational width of the machine. Another object consists in providing a particular drive for the spading machine so as to be able to vary the dimensions of the clods of earth spaded out of the ground.

FIGURE 1 is a plan view of a preferred embodiment of the spading machine according to the invention with the lateral spading units lowered;

FIGURE 2 is a side view of this embodiment;

FIGURE 3 shows on a somewhat enlarged scale a rear view of a part of the supporting- and lifting mechanism for the lateral spading units with one spading unit lowered and the other raised.

FIGURE 4 is a diagram showing on an enlarged scale the interior of a drive distributor forming part of the transmission means between the engine and the spading units.

The spading machine according to the invention consists mainly of a tractor like vehicle comprising a frame 1 upon which a motor 2 is mounted. The frame 1 is supported for travel over the earth surface by means of front wheels 3 and rear wheels 4. The main frame 1 carries a structure 5 comprising a pair of spaced, apertured plates positioned on edge transversely to the longitudinal direction of the frame 1. On both sides of the structure 5 a supporting arm 6 is connected to the vehicle by means of a pivot 7. At the end of each arm 6 a spading unit 8 of the type shown in U.S. Patent 3,012,616 is suspended by a pivot 9. The position of this pivot 9 on the spading unit 8 is such that the center of gravity 10 (FIG. 3) of said spading unit is disposed a slight distance inwardly with respect to a vertical plane 11 through the pivot 9 and parallel to the longitudinal direction of the vehicle.

The pivots 7 and 9 lie mainly in the same plane above the ground level when the side spading units 8 are lowered into ground contact. The meaning of this even level of the pivots 7 and 9 is that during operation a sideward tilting of the tractor (on account of uneven ground) practically no horizontal component of movement of the spading units relative to the tractor will occur, as would be the case when one of the pivots 7 or 9 is lying at a greater distance above the ground surface than the other pivot. In order to clearly show the position of the pivots 7 and 9 in FIGURE 2, the arm 6 has not been shown in that figure.

The motor 2 has an output shaft 12 upon which is mounted a first part 13 of a variable speed device, the second element 14 of which is mounted on a shaft 15. This variable speed device is of a type known per se in which each element 13, 14 consists of two conical flanges between which an endless belt is mounted. With this device, the rotational speed of the shaft 15 can be controlled without interruption. As will be explained further on, this shaft 15 is connected with the tractor wheels 3 and 4.

The energy of the output shaft 12 of the engine 2 is divided in two parts. One part is directly conducted to a drive distributing device 16 by means of a first transmission means 17 comprising several universal joints 18, 18' and intermediate shafts 19, 19'. This distributing device 16 includes a laterally disposed chain reduction gear (showin in FIG. 4) accommodated within a conventional casing 20. The distributing device has three output shafts 21, 22 and 23, the first two of which are situated near the ends on the front side of the casing 20 whilst the output shaft 23 lies in the middle of the casing at the rear side thereof. The output shafts 21 and 22 each have a drive connection 24, with the spading unit 8 lying on the same side of the vehicle which is universally jointed at each end.

The second part of the energy of the motor output shaft 12 is directed to the intermediate shaft 15 through the variable speed device 13, 14, said device constituting a second transmission means. The shaft 15 forms the input shaft for a conventional multistep gearing 25. This gearing has one output shaft protruding from both sides of the gearing. Through universally jointed drive connections 26 and 27 the energy is transmitted respectively to the drive mechanism 28 for the front wheels 3 and the drive mechanism 29 for the rear wheels 4.

The drive connections 24 transmit the energy of the output shafts 21 and 22 to a mechanism 30 forming part of the lateral spading unit 8. This mechanism 30 comprises a bevel gearing transforming and reducing the drive of the connection 24. On both sides of each spading unit 8 there is a chain drive 31 the input of which is connected to the output shaft of the mechanism 30, whilst the output is connected for driving the spades of the spading unit. The interior part of the spading unit 8 as well as its operation is more amply described in the U.S. Patents 3,021,616 and 3,161,240.

A third spading unit 8 is mounted at the rear of the vehicle by means of a conventional hitch-connection 32 with hydraulic lifting means (not shown). The mechanism 30 of this rear unit 8 has a drive connection 33 with the output shaft 23 of the distributing device 16, said connection being at both ends universally jointed.

As shown in FIGURE 3, the lateral spading units 8 can be lifted to an inoperative position (shown with respect to the right spading unit of this figure) by means of the supporting arms 6. These arms each have a pivot 35 to which a plunger rod 36 is connected, said rod sliding in a double acting pressure fluid jack cylinder 37, which in turn is pivotally connected by pin 38 to the structure 5. When the jack lifts the arm 6, the spading unit 8 in consequence of the position of its center of gravity 10 with respect to the pivot 9, will slightly tilt in clockwise direction (for the left hand unit as shown in FIGURE 3), said tilting movement being limited by the chain 39 connected to lugs 40 and 40' fastened to the arm 6 on the one hand and an element e.g. the casing of the chain drive 31 of the spading unit.

The working depth of each spading unit 8 is determined, by means of one or more shoes 41 each being mounted on a supporting arm 42. For sake of clarity only one shoe 41 for each spading unit 8 is shown in FIGURE 2.

On the rear part of the frame 1 two opposed seats 43 are mounted between which a steering wheel 44 is accommodate, so as to enable the driver to move backwards over long distances.

The distributing device 16 not only splits up the driving energy into three parts (the output shafts 21–23), but at the same time forms a reduction gearing by means of an appropriate choice of the wheels of the chain drive within the casing 20. By way of example the r.p.m. of the shaft 12 and the connection 17=2000, whilst the r.p.m. of the output shafts 21–23=550.

FIGURE 4 shows the interior of the casing 20. Connected to the input shaft 19', is a pinion 45 cooperating with a chain 46. This chain 46 further cooperates with three sprocket wheels 47, 48 and 49. The dimensions of the wheels 47–49 relative to the pinion 45 are such that there is a speed reduction of about 1:4. The wheel 47 is connected to the rear spading unit 8, whereas the wheels 48 and 49 are connected to either of the side spading units 8.

FIGURE 2 shows the machine in operative condition, during which the three spading units 8 are lowered into the ground surface. In this condition to drive from the shaft 12 is mainly going to the three spading units 8, as these units form the main source of propulsion for the whole machine. In this respect reference is made to the U.S. Patents 3,120,279 in which the operation of a spading machine of the type used in this invention is more extensively explained. A minor part of the driving energy of the motor 2 passes through the variable speed device 13, 14 to the wheels 3 and 4 of the vehicle, thereby performing a braking action for the propulsive forces exerted by the spading units 8.

By means of the speed device 13, 14 it is possible to obtain an adaptation of the thickness of the clods of ground. This adaptation is realised by maintaining the rotational speed of the spading units 8 at a constant value and by either speeding up or slowing down the forward speed of the tractor. By speeding up the rotation of the shaft 15 and thus of the forward speed of the tractor, the clods of ground become thicker, whereas by slowing down the speed of the shaft 15, the clods become thinner. This adaptation is required for performing a satisfactory spading operation with the same machine for different types of ground. For heavy clay, a clod of ground of reduced thickness is required, whereas for light and sandy soil, clods of maximum thickness are admissable.

The spading machine according to the present invention gives a number of advantages. In the first place it will be possible for the first time to perform a spading operation over a front of three times as wide as is possible with the spading machines according to the prior art i.e. over a front of 6–9 metres, dependent upon the size of each spading unit which might vary between 2.10 and 3.15 metres. The invention further renders it possible to drive the machine over normal auto-routes after having raised both side spading units, so that the overall width of the machine does not exceed the allowable size in transverse direction. The spading operation over a broad front is performed by means of an engine with a modest power output, contrary to conventional ploughing which generally requires very heavy tractors without, however, making it possible to operate a strip of ground broader than 2 or 3 metres. The double pivotal suspension of the side spading units permits an adaptation of these units to any uneven condition of the ground to be spaded. There are no problems of one spading element of a unit penetrating deeper into the ground than another spading element. The wheels of the tractor do not run over spaded ground so that the condition of the ground is excellent for further treatment such as harrowing, sowing and manuring. The location of the center of gravity of the side spading units relative to the location of the pivot with which these units are suspended on the lateral arms, is such that during raising and lowering, the side units will take a correct and well-determined position.

What I claim is:

1. A spading machine comprising a tractor having front and rear wheels, an engine and a driven shaft, a plurality of spading units for traveling in spading contact with the ground, a first transmission means connecting said spading units to said driven shaft, a second transmission means for driving at least two tractor wheels, at least two of said spading units being liftably mounted on opposite sides of the tractor forwardly of the rear wheels, each said side unit being suspended at its middle portion by a first pivot to an arm which in turn is connected to the tractor by a second pivot, the axes of both pivots being substantially parallel to the longitudinal axis of the tractor, both said side units when lowered being positioned completely outwardly of the rear wheels of the tractor, a third of said spading units being disposed symmetrically across the longitudinal axis of the tractor, rearwardly of the rear wheels and extending to a position outwardly of the rear wheels and offset laterally relative to both side units, each of said units having a number of spading blades disposed in a radial configuration around a hub, and said blades having portions transverse to the longitudinal axis of the tractor adapted to enter and dig clods of earth and simultaneously propel the machine forward while being driven by said driven shaft.

2. A spading machine according to claim 1 wherein said first transmission means comprises shaft means connected at one end by a universal joint to said driven shaft and extending longitudinally of the tractor, said shaft means being connected at its other end to a drive distributor disposed crosswise of the tractor and having output shafts at each side thereof, and a shaft connected at one end to each output by a universal coupling and connected at the other end by a universal coupling to a drive for the spading elements in the associated spading unit.

3. A spading machine according to claim 2 wherein said transmission distributor is further provided with a third output shaft extending rearwardly thereof, and means including a universal coupling connecting said third output shaft to a drive of the said third spading unit.

4. A spading machine according to claim 1 wherein said first and second pivots lie in the same plane above ground level when the side spading units are lowered into ground contact.

5. A spading machine according to claim 1 wherein said side spading units each has a center of gravity disposed inwardly of a vertical plane containing said first pivot when the unit is lowered into ground contact.

6. A spading machine according to claim 1 wherein the inner ends of said side units are substantially aligned longitudinally of the tractor axis with the outer ends of said rear unit whereby the machine with the spading units lowered and in operation leaves no strip of sod either unspaded or double spaded.

7. A spading machine according to claim 1 wherein said side spading units are lifted and lowered by power operated devices.

8. A spading machine according to claim 1 said second transmission means comprising a variable speed device controllable to vary the speed of said driven tractor wheels and thereby the thickness of clods dug by the spading units.

9. A spading machine according to claim 8 wherein said first transmission means drives the spading units at a given rate suitable for propelling the vehicle while digging and said second transmission means includes controllable variable speed means adapted to drive the tractor wheels at a slower rate whereby to act as a brake while the spading units are propelling the machine.

References Cited by the Examiner
UNITED STATES PATENTS

| | | | |
|---|---|---|---|
| 1,559,309 | 10/1925 | Brooks | 172—300 X |
| 1,945,882 | 2/1934 | Collins | 172—61 X |
| 2,881,581 | 4/1959 | Evans et al. | 172—302 |
| 2,936,561 | 5/1960 | Grimes | 56—7 |
| 3,012,616 | 12/1961 | Horowitz | 172—94 |
| 3,058,281 | 10/1962 | Lewis | 56—7 |
| 3,070,938 | 1/1963 | Winget | 56—6 |
| 3,071,198 | 1/1963 | Blocker | 172—60 X |
| 3,177,638 | 4/1965 | Johnson | 56—7 |

FOREIGN PATENTS

| | | |
|---|---|---|
| 562,233 | 5/1957 | Italy. |

ABRAHAM G. STONE, *Primary Examiner.*

F. B. HENRY, R. L. HOLLISTER, *Assistant Examiners.*